Aug. 29, 1967 B. L. SWERSEY 3,338,323
HYDRAULIC WEIGHING APPARATUS WITH REBALANCING
MEANS FOR DETERMINING LOAD DIFFERENTIAL
Filed Jan. 12, 1965 4 Sheets-Sheet 1

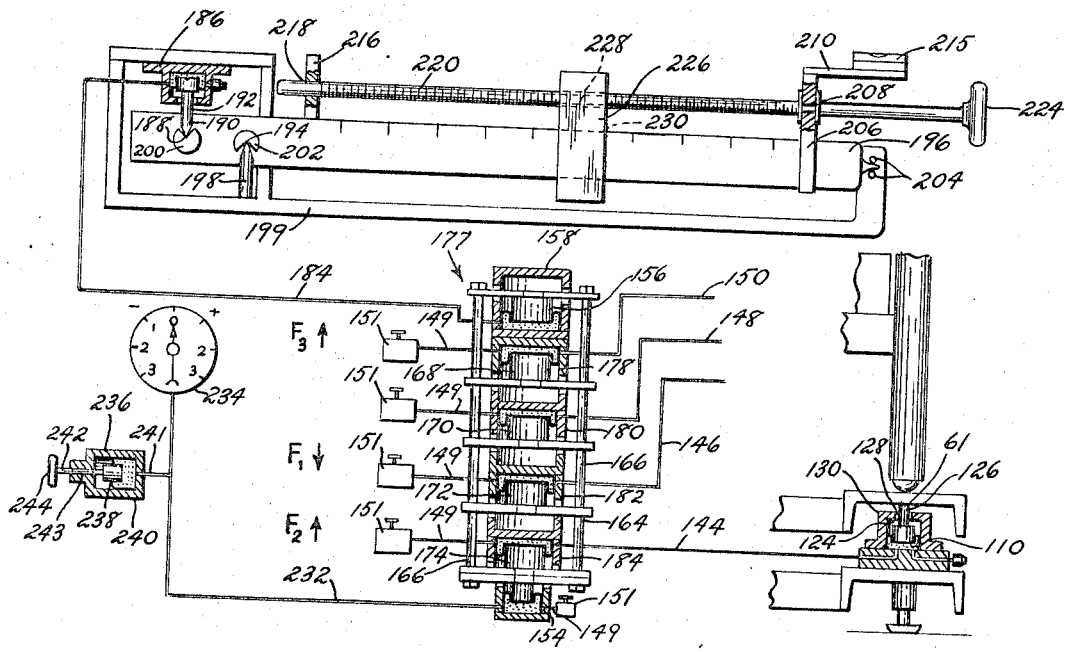
Fig. 4
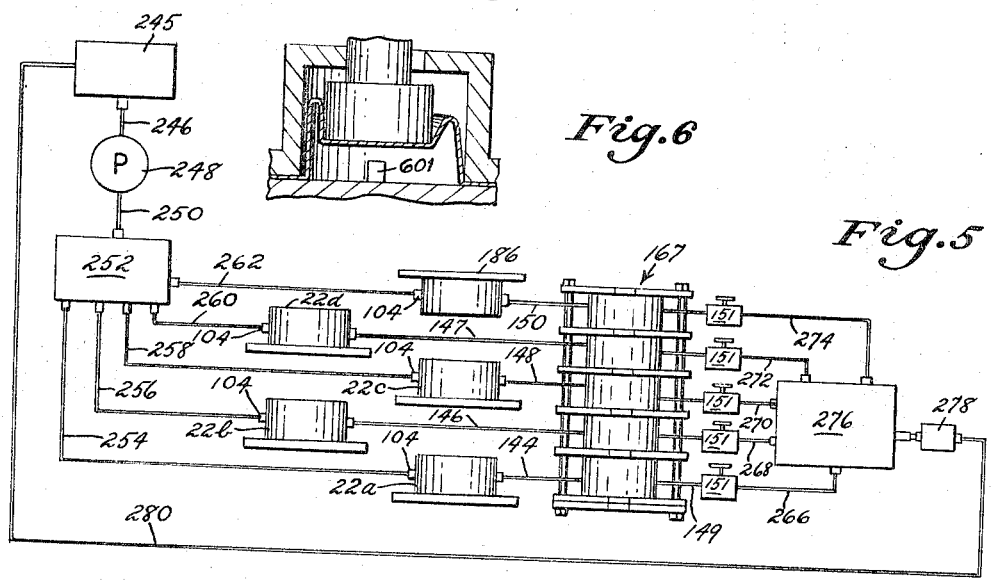
Fig. 6
Fig. 5
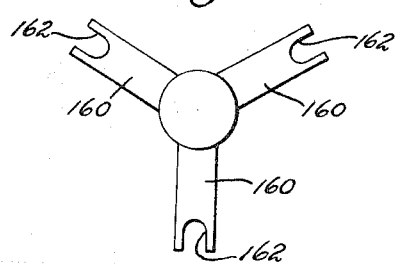
Fig. 7

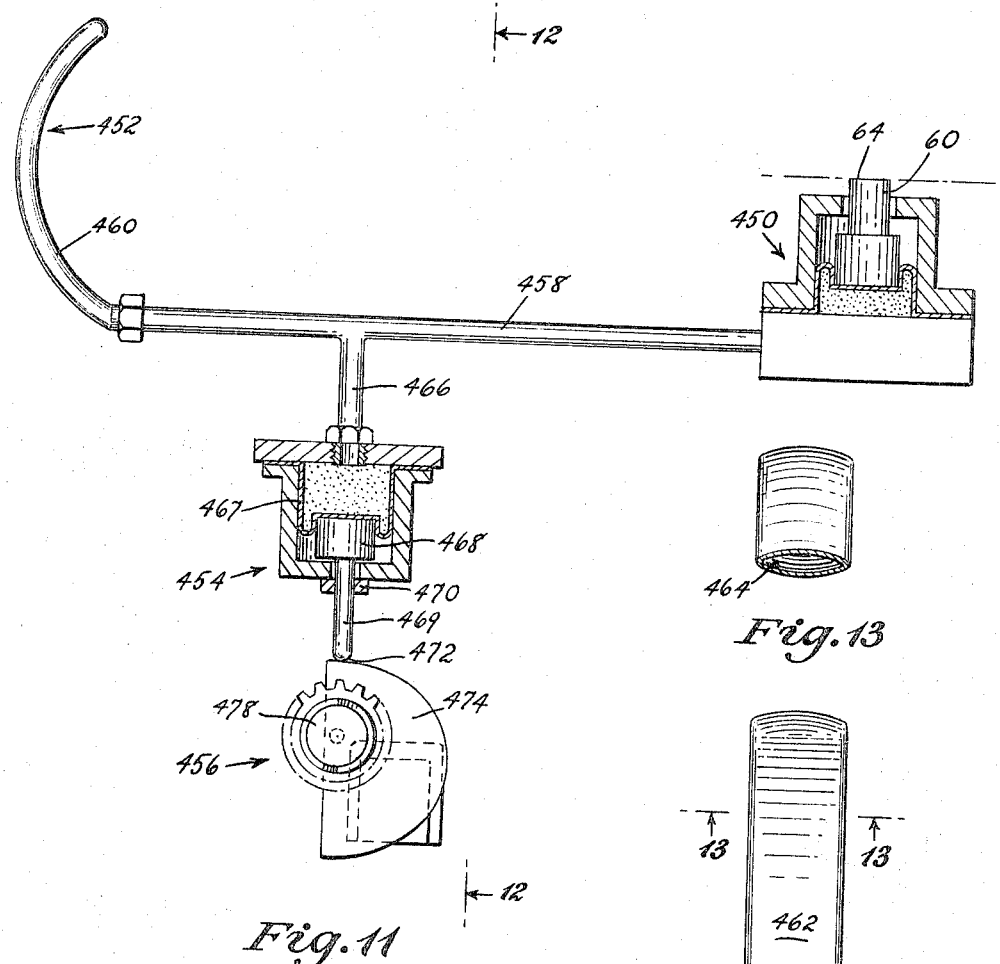
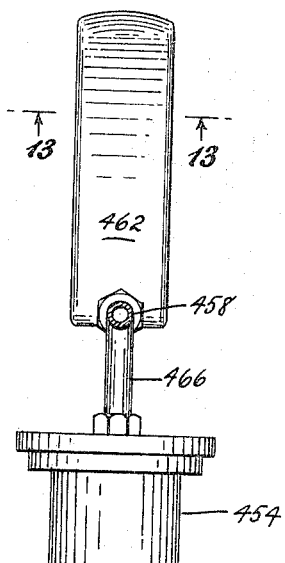
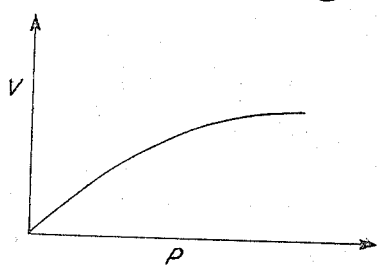
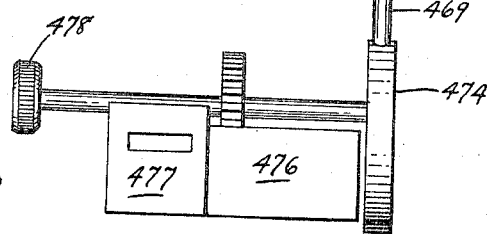
Fig. 11
Fig. 13
Fig. 14
Fig. 12

United States Patent Office 3,338,323
Patented Aug. 29, 1967

3,338,323
HYDRAULIC WEIGHING APPARATUS WITH RE-
BALANCING MEANS FOR DETERMINING LOAD
DIFFERENTIAL
Burt L. Swersey, White Plains, N.Y., assignor of fifty percent to C. Francis Roe, New York, N.Y.
Filed Jan. 12, 1965, Ser. No. 425,041
13 Claims. (Cl. 177—144)

My invention relates to an improved hydraulic scale. More particularly it relates to a hydraulic scale of extremely high sensitivity and accuracy which is particularly useful in the weighing of medical patients, as will be hereinafter explained.

A person's weight is constantly changing. Even when lying in bed, a normal adult continuously loses approximately 25–40 grams of water per hour through his skin and respiratory tract. With my scale which has a sensitivity of less than one gram, it is possible to accurately determine a patient's rate of weight loss by monitoring the change in their weight over a period of time as short as 15 minutes.

A burn patient can lose water at as much as ten times the normal rate because of the inability of the burned skin to act as an effective barrier to evaporation. If fluid is not returned to the patient at exactly the right rate, he will quickly become either dehydrated or overloaded with fluid. It is also important to know the rate at which water is evaporating from the patient's skin, because the evaporation results in a loss of heat from the body. In order to replace this heat and maintain the body temperature, the patient must expend a considerable amount of energy. Several severely burned patients have now been treated on this scale and have survived because their fluid and energy requirements were calculated with a high degree of accuracy.

In patients undergoing hemodialysis (treatment with the artificial kidney) fluid is removed from the patient's blood. Although under certain circumstances this is desirable the rate at which fluid is removed must be controlled by making adjustments in the equipment since it directly effects the patient's circulating blood volume. By continuously monitoring the patient's weight on a highly sensitive scale, during the dialysis, the necessary corrections can be made to achieve the most desirable rate of fluid removal.

These are only two of the many medical applications for which this scale can be effectively used.

Hydraulic scales are of course known for use in the industrial field. Typical examples of such scales are shown in United States Patents 2,341,174, issued Feb. 8, 1944, 2,439,533 issued Apr. 13, 1948, and 2,596,032 issued May 6, 1952. Examples of hydraulic load cells used in these scales are shown for example in United States Patents 2,960,113 dated Nov. 15, 1960, and 2,960,328 dated Nov. 15, 1960. However, scales of the general construction suggested by the cited patents using load cells of conventional manufacture are not suitable for use in the environment for which the scale of my invention is designed. In particular, there are errors and a loss of sensitivity introduced into the readings as a result of friction and hysteresis in conventional load cells principally because the pistons of the cells are mounted in bearings or the like to guide them. Further, if the load cells are merely supported on the floor under a bed and each of the four legs of the bed placed on a cell, deflection or skewing of the legs of the bed can adversely affect the load cell readings. Further, temperature changes can result in relative motion between the piston and cylinder of the load cells as a result of unequal expansion of the floor and bed frame. While these effects result in inaccuracies, for most industrial applications they are sufficiently small so that they are unimportant. However, for medical applications, where extreme accuracy and precision as well as high sensitivity are required, such effects can cause errors which are substantial and significant in the patient's treatment. Accordingly, the construction of conventional hydraulic scales is not useful for medical applications.

As will be apparent from the foregoing, it is a principal object of my invention to provide an improved hydraulic scale of high sensitivity, accuracy and precision which is suitable for continuous monitoring of the weight of a hospital patient.

Another object of my invention is to provide a scale that will allow either changes in a patient's weight to be observed or the absolute weight of the patient to be obtained regardless of bedclothes or objects placed on the scale.

Another object of my invention is to provide a scale that will allow a patient to continuously remain on it, without interfering with normal medical care.

Another object of my invention is to provide a scale of the type described which utilizes hydraulic load cells of the "unguided piston" type in contrast to the conventional "guided piston" type conventionally used for such scales.

A further object of my invention is to provide a scale which returns all scale elements, including the load cell pistons to their original positions before making a measurement of weight.

A still further object of my invention is to provide a scale which is simple and rugged in construction, relatively simple in operation, and which requires relatively little maintenance.

Other objects of the invention will in part be obvious and will in part appear hereinafter.

The invention accordingly comprises the features of construction, combination of elements, and arrangement of parts which will be exemplified in the constructions hereinafter set forth, and the scope of the invention will be indicated in the claims.

For a fuller understanding of the nature and objects of my invention, reference should be had to the following detailed description taken in connection with the accompanying drawings in which:

FIGURE 4 is a partially schematic, partially cutaway view of the hydraulic weighing system of the first embodiment.

FIGURE 5 is a schematic view illustrating the method of filling the hydraulic system with fluid.

FIGURE 6 is a view, partially cut-away, illustrating the application of a lateral force upon the piston of the load cells.

FIGURE 7 is a bottom plan view of the piston of the totalizer cells of the first embodiment.

FIGURE 11 is a schematic view partially cut-away, of a third embodiment of the invention.

FIGURE 12 is a cross-sectional view as seen from the plane 12—12 on FIGURE 11.

FIGURE 13 is a cross-sectional view as seen from the plane 13—13 on FIGURE 12.

FIGURE 14 is a graph illustrating the relationship between pressure applied to the pressure sensing device and the change in volume thereof.

Figure 1:
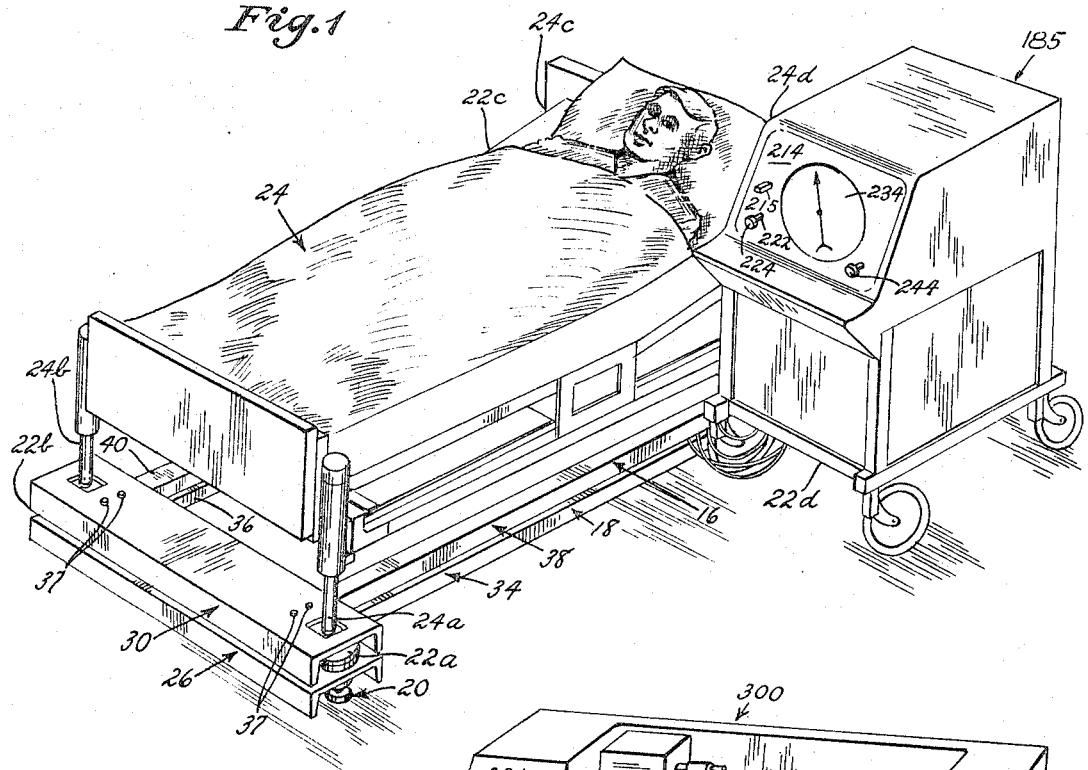
FIGURE 1 is a perspective view of a first embodiment of the invention.

In accordance with a first embodiment of my invention, as shown in FIGURE 1, the scale of my invention includes a pair of frames 16 and 18. The frame 18 is supported on four adjustable feet 20 of conventional type, on the floor of the room in which the scale is to be used. The feet 20 are not secured to the floor, and are free to slide according to the thermal expansion or contraction of the frame. Casters may replace or be adjacent to the adjustable feet to allow the frame to be readily moved from one location to another. The lower frame 18 supports thereon the cylinder portion of four hydraulic load cells 22a, 22b, 22c, and 22d, whose detailed construction will be hereinafter described. The pistons of these four cells are attached to the second frame 16, which is substantially identical to the first. The upper surface of the frame 16 supports thereon the bed 24 or other load.

Each of the frames 16 and 18 include a pair of structural channel members, the channels for the frame 18 being identified as 26 and 28 and those for the frame 16 being identified as 30 and 32. The channels for each frame are secured together by elongated members so that in the plane defined by the frame the two channels of each frame are rigidly positioned with respect to each other. The elongated members associated with frame 18 are identified by the reference characters 34 and 36 and as shown are box section beams secured to the channels 26 and 28 as by bolts 37 or in any other suitable fashion. The frame 16 is similarly constructed with elongated members 38 and 40 secured at each end to the channels 30 and 32.

The cylinder portions of the hydraulic load cells 22a and 22b are positioned on the channel 26 and the cylinder portions of the cells 22c and 22d are positioned on the channel 28. These cells are fixed in position on the frame 18 as by bolting. The four cells support above them, on their associated pistons, the frame 16 by attachment of their pistons to the channels 30 and 32.

In this fashion the cylinders of the four load cells are securely fastened to the frame 18 and their pistons to the frame 16. The frames 16 and 18 are preferably of the same material, but in any case are constructed of materials having the same coefficient of thermal expansion. Thus, changes in temperature will not result in relative motion between the pistons and cylinders of the cells. This is an important source of error in prior constructions which is eliminated in the scale of my invention.

It is essential for proper operation of the invention, that both channel members of each frame be constructed so as to lie in the same plane. Also the center lines of the pistons must correspond with the center lines of the cylinders. A level vial, preferably of the circular type may be secured to the lower frame 18 to establish it in a horizontal reference plane.

As will be explained in greater detail below, the pistons of the load cells 22a, 22b, 22c, 22d, are "unguided." That is, they are not positioned in the cylinders by bearings, stayplates, links, flexures or springs. Further, there is a substantial clearance between the sides of the pistons and the cylinders. For this reason, the pistons must not be subjected to forces which would tend to tilt them since no provision is made, in the load cells themselves to accommodate this tilting. Further, the pistons are free to translate within the cylinders being limited in their motion only by physical stops.

In general, to use load cells of the type described, the pistons of at least three cells, at least one of which does not lie on a line joining the other two must be rigidly joined together as they are in FIGURE 1 by the frame 16. This frame must be of sufficient rigidity so it will not substantially deflect under applied loads, or alternatively the load must be applied directly above the point where the pistons of the cells are secured to the rigid frame which joins them.

In the illustrated embodiment the frame 16 is relatively light in weight, although rigid in the horizontal plane which it defines. To prevent undesirable tilting of the pistons of the load cells, the legs 24a 24b, 24c, and 24d of the bed 24 are positioned on the upper surface of the channels 30 and 32 substantially immediately above the point where the pistons of the load cells are attached to these channels. The frame of the bed 24 then acts as a third frame which can deflect under the weight of a patient placed therein. However, since force can only be transmitted down the legs of the bed to the frame 16 to a point immediately above the load cell pistons, this force cannot cause deflecting of the frame 16 with consequent tilting of the pistons.

In applications of my scale where it is desirable that the load to be weighed be placed directly on the frame supported by the pistons, the frame must be sufficiently massive and rugged in construction so that the frame will not deflect under the applied load no matter where said load is placed on the frame. While such a construction is workable the construction here disclosed, using the bed or similar intermediary structure as a third frame which absorbs deflections is preferable because the construction of the frame 16 may then be of relatively light weight.

Figure 3:
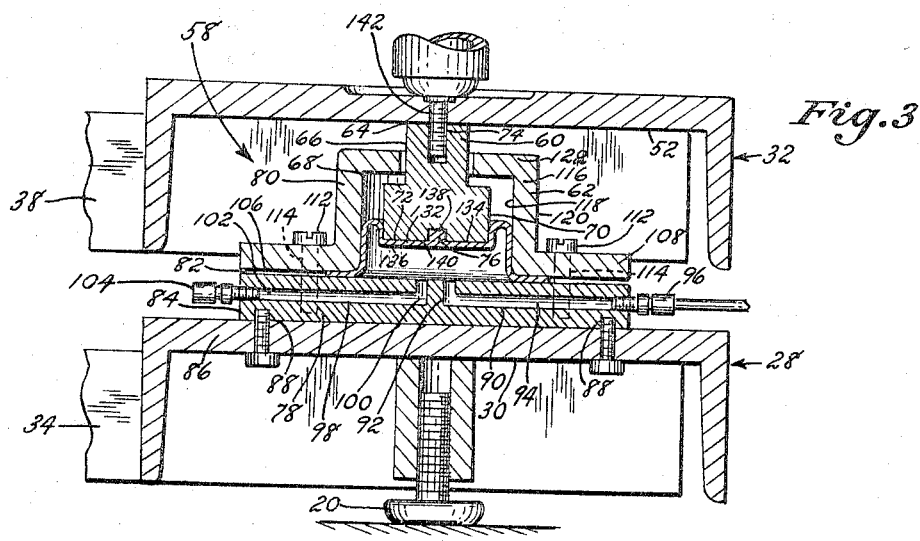
FIGURE 3 is a cross-sectional view showing the detail of the load cell positioned between the upper and lower frames of the platform.

Referring to FIGURE 3 there is shown a cross-sectional view of a load cell 58 whose structural characteristics are similar to all the hydraulic cells used in the invention.

The piston 60 is cylindrical in shape and has a top surface 64, a first side surface 66, an angular shoulder surface 68, a second side surface 70, and a bottom surface 72. Passing into the piston from the top surface 64 is a very accurately located axial threaded bore 74, extending approximately half the length of the surface 66. Passing into the piston from the bottom surface 72 is an axially located, smooth surface bore 76.

The cylinder 62 is composed of a baseplate 78 and a housing 80. The baseplate is cylindrical in configuration and has a top surface 82, a side surface 84, and a bottom surface 86. Bolt holes 88 are formed in the plate 78 to secure the load cell in position. A passage 90 having a vertical portion 92 and a horizontal portion 94 is formed in the baseplate 78, ending at a conventional fitting 96. In a similar manner, a passage 98 having a vertical portion 100 and a horizontal portion 102 is formed in the baseplate 78, but ending in a ballcheck valve 104. The baseplate has a second set of boltholes 106 passing down from the top surface 82.

The housing 80 has an outwardly extending angular flange 108 defining an opening 110, and it is secured to the baseplate 78 by means of bolts 112 passing through boltholes 114, 115. Extending upwardly from the flange 108 is a cylindrical sidewall 116 with an inner surface 118 and an outer surface 120, then an inwardly extending angular flange 122, having a lower surface 124, a side surface 126 defining an opening 128, and an upper surface 130. The opening 128 is of sufficient diameter to accommodate the shank portion 66 of the piston 60 with clearance to allow lateral motion.

The piston 60 is located within the cavity 62 formed by the housing 80 and baseplate 78, and is maintained in position by a flexible rubber impregnated diaphragm 132, with convolution 140. The diaphragm 132 is secured between the bottom surface 111 of member 80 and the top surface 82 of plate 78, and has a top surface 134 and a bottom surface 136. Axially positioned on the top surface 134 is a teat 138 engaging bore 76 of the piston 60, which accordingly is centered on the diaphragm 132. The piston is secured to the upper channel 32 by means of a bolt 142 passing into the threaded bore 74.

The space beneath the diaphragm 132 is filled with oil or other fluid.

It will be observed that the piston 60 is not guided or supported in any manner within the cylinder. It is centered by the convolution 140 in diaphragm 132 but is free to tilt and move freely without restraint in the cylinder although it is secured to the upper channel member as by the bolt 142. The engagement of the shank 66 with the periphery of the opening 128 prevents excessive lateral motion of the piston with respect to the cylinder and, since the pistons are directly attached to the frame 16, prevents excessive motion of this frame with respect to the frame 18.

When a lateral force is applied to the piston it will move towards the opposite side of the cylinder until the shank of the piston engages with the periphery of the opening 128. As shown in FIGURE 6, the adjacent part of the diaphragm convolution will be heaped up, whereas it will be flattened on the opposite side. The hydraulic forces on the sidewalls of the piston will be unequal due to the unsymmetrical diaphragm convolution, and will tend to return the piston to its original central position when the deflecting force is removed. As such a deflecting force will be counteracted simultaneously by all four of the load cells, this system has great inherent lateral stability.

As shown in FIGURE 4, each of the load cells 22a, 22b, 22c, and 22d is connected by a length of hydraulic tubing to one of the cylinders of a hydraulic totalizer generally indicated at 177.

The totalizer illustrated in generally schematic form consists of four cylinders 178, 180, 182, and 184 with pistons 168, 170, 172, and 174. Each hydraulic line from one of the load cells communicates with one of the oil films in one of the totalizer sections. Thus, hydraulic line 144 connects load cell 22a and the totalizer cylinder 184 and each of the other load cells are connected to corresponding totalizer cylinders. Each totalizer cell is also connected by tubing 149 to a valve 151.

Totalizer cylinder 158 is connected to the beam balance cell 186 with tubing 184. This cell is similar in structure to the load cells 22.

Totalizer cylinder 154 is connected to a Bourdon tube pressure gauge 234 and to adjustable cylinder 236, with tubing 232. The area of cylinder 154 may be made smaller than the area of the other totalizer cylinders for the reason described below.

The pistons are free to move in the vertical direction in their respective totalizer cylinders. The pistons of the totalizer differ from those of the load cells 22 by replacement of the shank portion 61 with three outwardly extending fingers shown as 160 in FIGURE 5. Each finger 160 extends outwardly of the cylinder and has an indent 162 which engages the reduced diameter 164 of totalizer rods 166.

The sum of the forces transmitted to totalizer pistons 168, 170, 172, and 174 from load cells 22, may be designated as $F_1$. This force is opposed by the forces of cells 154 and 158, designated as $F_2$ and $F_3$ respectively. Thus, $F_1 = F_2 + F_3$.

The variation in effective areas of the different cells further increases the accuracy of this scale. For maximum sensitivity the area of totalizer cells 178, 180, 182, 184 designated as $A_1$ should be greater than the area of the load cells 22 designated as $A$. The area of totalizer cell 154 designated as $A$, should be smaller than $A_1$. The areas of load cells 22, cell 186 and totalizer cell 154 may all be equal. The areas of cell 158 may be equal to $A_1$.

If a force $\Delta F$ is applied to the load cells 22, the force $\Delta F_1$, generated in the totalizer will be $\Delta F$ multiplied by the ratio $A_1/A$. $\Delta F_1$ is transmitted to piston 154 and the resulting pressure change $\Delta P$ is transmitted to the pressure gauge 234.

$$\Delta P = \frac{\Delta F \left(\frac{A_1}{A}\right)}{A}$$

Thus, the pressure change applied to the pressure gauge 234 is magnified.

The totalizer structure 167 may be supported on the frame 18 or in the console 185.

The force $F_3$ in the totalizer is the result of a force applied to the piston 192 of beam balance cell 186. Secured to the end of the shank 190 of the piston 192 is a male knife-edge 188. This knife-edge 188 is supported by bearing 200 which is rigidly attached to the beam 196. A second male knife-edge 194 on the end of shank 198, is the pivot point of the beam 196. It is supported by bearing 202 rigidly attached to the beam 196. The bearings 200 and 202 are in line with each other and along the line of the center of gravity of the beam.

The beam 196 is limited in its rotational motion by a pair of stops 204. Mounted on the end of the beam opposite the cell 186 is an upwardly extending support 206 with a bearing passage 208 parallel to the beam 196. An arm 210 extends outwardly from the arm 206 through the opening 212 in the front 214 of the console 185. A level vial may be mounted on the arm 210 to indicate the position of the beam 196 with respect to a reference position.

Mounted on the beam 196 is a second upwardly extending support 216 with a bearing passage 218 parallel to the beam. A leadscrew 220 passes through an opening 222 in the front 214 of the console 185 ending in a knob 224. The screw 220 drives a weight 236 having a threaded bore 228. The weight 226 has a slot 230 to accommodate the beam 196. By turning the knob 224, the weight 226 can be moved along the beam 196 to change the force applied to the piston 192.

The adjustable cylinder 236 has a piston 238 and a diaphragm 240. The piston diaphragm and cylinder define a variable volume cavity for fluid contained therein. The axial movement of the piston is regulated by a leadscrew 242 passing through a threaded support 243 and ending in a knurled knob 244.

The hydraulic system may be filled by any known method such as, for example the apparatus shown schematically in FIGURE 5. The fluid used in the system should be an incompressible liquid such as oil. The oil is supplied by a reservoir 245 through tubing 246 to a pump 248. The oil then passes through tubing 250 to a first manifold 252 with five feeder lines 254, 256, 258, 260, 261. The oil fills the the spaces beneath the diaphragms and passes through the tubing 144, 146, 147, 148, 150 to the totalizer cells. The oil fills the spaces beneath the diaphragms of the totalizer cells, passes through the passages 149 and valves 151, through tubing 266, 268, 270, 272, 274 to a second manifold 276. The oil exits through a single line to a valve 278 and passes through tubing 280 back to the reservoir.

In operation the first embodiment is used to detect and measure changes or variations from a predetermined weight such as the initial total weight of the patient. A load is applied to the scale, as by placing a patient on the bed, and the pistons will all move a slight amount, causing a movement of the beam, and causing a change from the original reading on the Bourdon tube gauge. The force $F_1$ transmitted from the load cells is opposed by the force $F_3$ of the beam balance cell and the force $F_2$ of the Bourdon tube gauge. To put the system in balance so $F_1 = F_2 + F_3$, the position of the weight 226 is adjusted on the beam until the level vial 215 is substantially horizontal. Then the knob 244 is turned until the pointer of the dial indicator 236 is opposite a pre-set point which represents a pressure equal to half the total pressure capacity of the gauge. The beam is rebalanced and the knob 244 is readjusted until both the level vial is horizontal and the pointer of the indicator is at the pre-set point. As the weight of the patient varies, the system will be thrown out of balance. The system is brought back into balance by varying $F_2$. This is done by adjusting the knob 244 until the level vial is again horizontal.

The change in $F_2$ will be reflected by a change in the dial reading of the pressure gauge and this change will be directly proportional to the change in applied weight.

The beam balance mechanism is in effect, an infinitely variable tare mechanism within its maximum and minimum limits. The knop 224 could be adjusted until the pressure at the gauge 234 is zero with the tare load on the scale. The object to be weighed could then be placed on the scale and the weight read directly on the gauge 234.

A second embodiment of the invention utilizes the frames 16 and 18 with the corresponding load cells 22a, 22b, 22c and 22d, the beam balance is used to read absolute weight directly, and the pressure indicating gauge is eliminated. Thus, the totalizer force $F_1$ is opposed solely by the beam balance force $F_3$.

Figure 2:
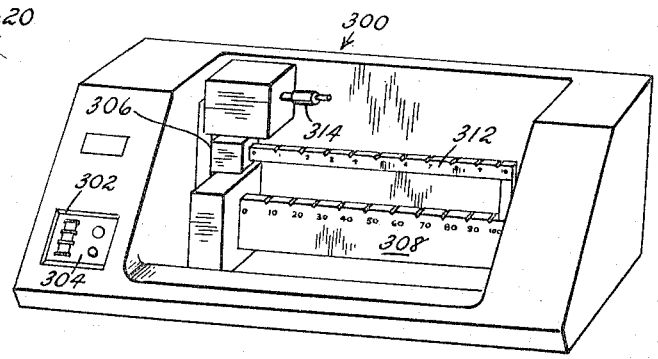
FIGURE 2 is a perspective view of the console of a second embodiment of the invention.
Figure 8:
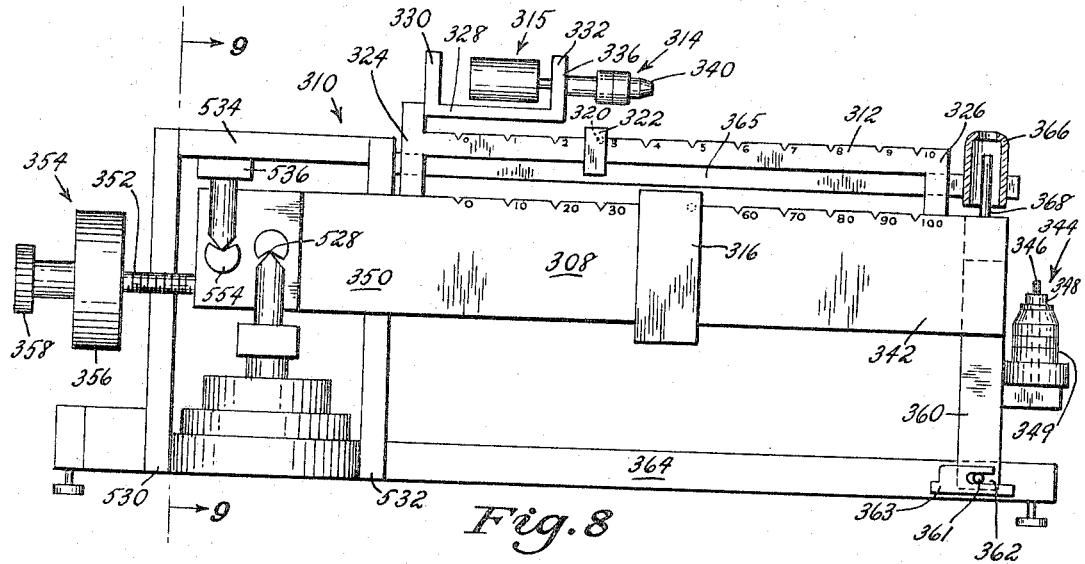
FIGURE 8 is a view of the beam balance mechanism of the second embodiment.

As shown in FIGURE 2, the console 300 may be fabricated of sheet metal or fiberglass and has an opening 302 to accommodate a read-out plate 304. A second opening 306 allows the beam to be exposed for balancing purposes. The right end of the main beam 308 passes back into the interior of the console. Referring in part to FIGURE 2 and in part to FIGURE 8, there is shown a beam balance 310 with a main beam 308, a secondary beam 312, and a fine adjustment member 314. The main beam 308 is notched for increments of ten kilograms and has a weight 316 with a slot 318 for accommodation on the beam 308. The secondary beam 312 is notched for increments of one kilogram, and has a weight 320 with a slot 322 for accommodation on the beam 312. The weights 316 and 320 each have a cylindrical pin which locates in the notches on the beams. The beam 312 is mounted on beam 308 by supports 324 and 326 and is parallel thereto. The support 324 extends above the beam 312 and has secured to it a cradle 328 with opening 336 to support the micrometer 314 in parallel relation to the beams 308, 312. The member 314 is a micrometer with a calibrated weight 315 attached to the spindle measuring in increments of grams from zero to 1000 grams. The position of the weight may be adjusted by rotating the knob 340.

Mounted on the right end 342 of the beam 308 beyond the support 326 is a tare control 344, which consists of a threaded rod 346 and mating nut 348. Various sizes of weights 349 may be added to provide a rough balance for the bed. On the left end 350 of the beam 308 is secured a threaded rod 352 with a mating fine balance tare control weight 354. This weight allows adjustment for tare over a range of approximately ten pounds.

An indicator (not shown) may be mounted on the right end 342 of the beam 308 with a level vial, or other similar device, secured thereto for establishing the balance position. Extending downwardly from the beam 308 is an arm 360 with a pin 361 restricted within a slot 362 in member 363, which is secured to the reference frame 364 of the balance. The pin has a small clearance within the slot to limit the movement of the beam.

Figure 9:
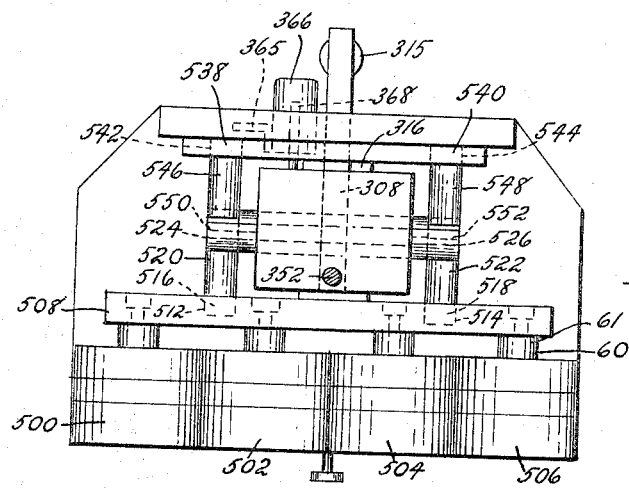
FIGURE 9 is a cross-sectional view as seen from the plane 9—9 on FIGURE 8.

The totalized force from the load cells may be applied to a beam balance in a manner similar to the first embodiment. Alternately, the pressures from the load cells may be transmitted to the totalizer shown in FIGURES 8 and 9. Instead of being stacked, vertically the totalizer cells 500, 502, 504, 506 are positioned horizontally. Chordal portions of the housings have been removed to allow a more compact assembly. Otherwise, the totalizer cells are identical in construction to the load cells 22, described above. The shank 61 of all the pistons 60 are rigidly secured to the totalizer plate 508 by means of threaded bolts 510 engaging the threaded bolt holes 74. The plate 508 has two holes 512, 514 receiving the shank portion 516, 518 of identical rods 520, 522. The rods end at knife edges 524, 526 which are received in bearings 528.

Extending upwardly from the reference frame 364 are side plates 530, 532 supporting a reference member 534 and a plate 536. The plate 536 has two holes 538, 540 receiving the shank portion 542, 544 of two identical rods 546, 548. The rods end at knife edges 550, 552, which are received in bearing 554.

This construction eliminates two cells 158 and 186 from the previous design, and simplifies manufacture, since all the cells of the scale can now be identical in dimension, except for the removal of materials for the totalizer cells.

To increase the accuracy of establishing the balance position, electrical means may be used to indicate balance as well as beam deviation from the balance position, so that the operator may know in which direction to move the weights to establish balance.

Figure 10:
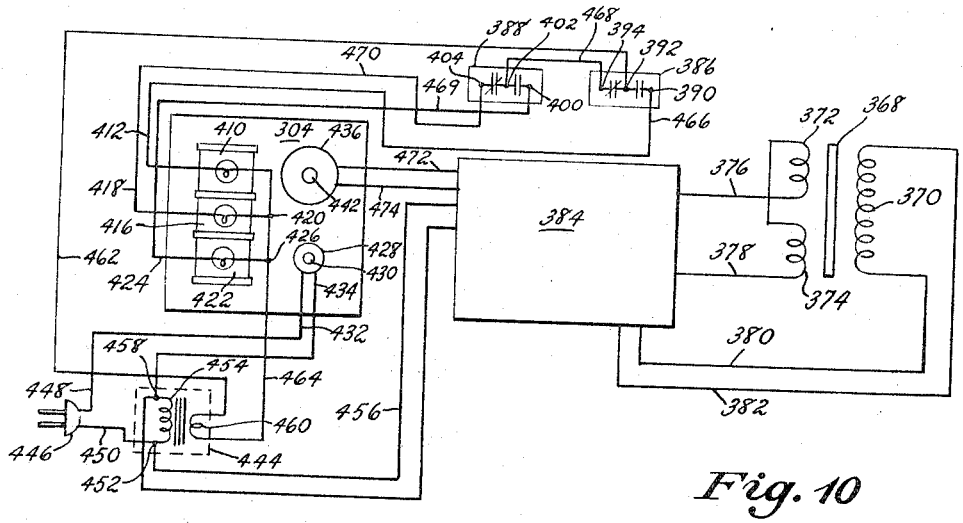
FIGURE 10 is a schematic view of the electronic level indicating means.

An arm 365 is supported from the frame 532 and carries a housing 366 of a differential transformer. Accurately mounted on the arm 360 is a core 368 which may move reciprocally within the housing 366. Referring to the schematic illustrated in FIGURE 10, the housing 366 consists of a primary winding 370 and two secondary windings 372, 374. The core moves reciprocally when the beam moves, since it is secured thereto. The four leads 376, 378, 380, 382 of housing 366 are connected to the indicator light control circuit 384 which supplies the leads 380, 382 and primary winding 370 with power. When the beam 308 is in its neutral position, the core 368 is positioned so that the signals induced in the coils 372, 274 is equal. If the end 342 of the beam 308 rises above the neutral position, the core also rises and a larger voltage is induced in the winding 374. If the beam drops below its neutral position, then a larger voltage is induced in the winding 374 and a lesser voltage in the winding 372. These voltages are supplied to the control circuit 384. The circuit 384 contains a pair of relays 386, 388. The relay 386 has contacts 390, 392, 394 and the relay 388 has contacts 400, 402, and 404.

A read-out plate 304 is affixed to the console 300 in opening 302 and has three lights; red 410 with contacts 412, 414; yellow 416 with contacts 418, 420; and blue 422 with contacts 424, 426. The plate 304 houses an on-off switch 428 activated by knob 430. The switch has contacts 432, 434. The plate also houses a potentiometer 436. It is calibrated in grams and the knob 442 may be positioned to allow for a sensitivity of between one and five grams. Also located adjacent to circuit 384 is a step-down transformer 444.

Voltage is supplied to the system from a 115 volt, 60 cycle source through plug 446 with one lead 448 connected to contacts 432 of switch 428 and the other lead 450 connected to contact 452 of primary winding 454 of the transformer 444. A wire 456 connects the contact 452 to circuit 384. The other contact 434 of switch 428 is connected to contact 458 of winding 454. The contacts 452, 458 are also connected to circuit 384 to provide the necessary operating power. One side of the secondary winding 460, is connected by lead 462 to contact 392 of relay 386. The other side of the winding 460 is connected by wire 464 to contacts 414, 420, 426, of the right 410, 416, 422. The contact 390 is connected by wire 466 to contact 412; contact 394 is connected by wire 468 to contact 402; contact 400 is connected by lead 469 to contact 418; and contact 404 is connected by wire 470 to contact 424. The contact 392, 394, and 402, 404, are normally closed; and the contacts 390, 392, and 400, 402 are normally open. Potentiometer is connected to the circuit 384 by wires 472, 474.

When the circuit is activated by closing switch 428, and with the scale system in balance, the voltages from the winding 372, 374 are equal, and current flows from the secondary winding 460 through lead 462, contact 392, contact 394, lead 468, contact 402, contact 404, lead 470, to lamp 416, and then back to winding 460. If the voltage from winding 372 increases, as described above, circuit 384 causes physical movement in the relay 386. Then current flows from contact 392, through contact 390, lead 466, to lamp 410 and back to lead 464 to the winding force 60. This indicates that the beam balance 310 has pivoted downwardly. If the voltage from winding 374 increases, circuit 384 causes physical movement in the relay 388. Then current flows from contact 392 through contact 394, lead 468, contact 402, contact 400, lead 469, through lamp 422 and back to lead 464 to winding 460. This indicates that the beam balance 310 has pivoted upwardly.

In place of the three electric lamps, a meter may be substituted for use with the circuit and differential transformer. The indicator on the face of the meter may illustrate a position of the beam either above or below the horizontal reference position, and it would also illustrate the actual physical movement of the beam balance. Knowledge of the movement of the beam would expedite the balancing procedure.

In operation a tareload such as a bed is applied to the platform and is tared out by placing weights on the tare control 344 for balancing. The fine adjustment is made by manipulating the fine balance control weight 354. The electric balance indicating means establishes the balance position. When a patient is placed on the bed the system is thrown out of balance. In the same manner as in the first embodiment, the loadcells are slightly displaced causing a displacement in the totalizer, which in turn displaces the beam balance piston. The weights 316, 320 are moved along the beam in that order, to restore the beam to the balance point, which is determined by the electrical balance indicating means. As in the first embodiment, the balance position returns all the pistons to their initial reference planes; thus the position of the system when in the balanced position is precisely the same with a load as it was before the load was applied. The weight of the patient may now be read to an accuracy of 1 gram.

Overloading may be a problem in any hydraulic system employing pressure indicating devices. Hydraulic cells currently being made have rated overload capacities, and of course, pressure indicating devices such as the Bourdon tube pressure gauge also have a rated overload capacity. In a similar manner, if the overload capacity of a strain gauge is exceeded it will be permanently damaged. There are several methods of solving the problem of overload damage, which are employed in the present invention. One construction (FIG. 6) involves the use of a stop 601 to limit axial displacement of the load cell pistons 60. Since an applied load causes a change in volume of the sensing element, the stop 601 is so positioned that the piston 60 will bottom on the stop when the piston has moved a distance corresponding to the overload capacity of the pressure indicating device. Another construction employed is to have an expandable cavity with a spring loaded member maintaining the cavity at a specific volume. When the pressure in the system exceeds the overload capacity of the pressure indicator and/or load cells, the yield point of the spring loaded member is reached, and the cavity expands until the pistons of the cells bottom on their baseplates or stops. A third type of construction that may be employed is to springload the stop 363 of the beam so that when overload capacity is reached, the beam will be allowed to rotate upward causing the load cell pistons to move until they bottom on baseplates or stops.

Now turning to a third embodiment of the invention, there is shown in FIGURES 11–15, a scale. The embodiment comprises broadly a load cell 450, a pressure responsive device 452, a volume compensating unit 454, and a read-out means 456.

The load cell is similar in construction to the load cells previously discussed, and like reference characters indicate like parts. The important feature is that means must be present to indicate the initial reference plane of the top surface 64 of the piston 60 to allow this position to be reestablished after displacement due to application of a load. Such means may be a dial indicator (not shown) or the electronic indicating means described above. The cell 450 may either have a weight applied directly to it with this embodiment being used as a complete weighing system or cell 450 could be used to replace cell 158 in the second embodiment. The read-out of this embodiment would then replace the beam balance mechanism.

If this embodiment is used as a complete weighing system, a means such as a bearing or stayplate must be employed to support the piston 60.

The pressure responsive device 452 is connected to the cell 450 by means of tubing 458. The device must be a hydraulic pressure sensing device whose capacity varies in a predictable fashion with changes in internal pressure. The device may be an expandable metal bellows (not shown) or a Bourdon tube. The device used in this embodiment is a Bourdon tube 460 which is elliptical in cross-section, having a curved outer surface 462 and a curved inner surface 464 defining an interior volume.

The unit 454 is connected to the system by tubing 466, and contains a diaphragm 467 and a piston 468 secured to a rod 469, which is maintained in position by a bearing 470. The end of 472 of the rod 468 is rounded and serves as a cam follower.

The read-out means 456 comprises a cam actuated by the unit 454. The cam design will be discussed below. The cam is connected to a gear-box 476 and to a read-out counter 477 which is of the resettable type. The means 456 is operated by a knob 478 or by an electric motor (not shown).

The principal of operation of this embodiment is based upon the fact that applying a load to a Bourdon tube or other sensing element will change its volume. This change is due to a change in the cross section of the tube from an elliptical to a circular shape as the tube straightens under pressure. A graph of volume versus pressure is shown in FIGURE 14. Since the graph may be non-linear, the cam 474 can act as a compensator for the non-linearity. When a load is placed on the piston 60, the pressure is increased in the system, resulting in an increase in the volume of the sensing element. In order to accommodate this increased volume, fluid will move from other parts of the system into it, and the piston will move downwards. By adjusting the unit 454, fluid is transferred from unit 454 to the sensing element and the piston is returned to its initial reference plane.

When the piston has been returned to its initial reference plane, the reading of the read-out counter is noted. This may be directly calibrated to read weights in accordance with the volume change.

The system may be balanced with an initial load such as a bed, and the counter set to zero to tare out this initial load.

I wish it to be understood that I do not consider the invention limited to the precise details of structure shown and set forth in this specification, for obvious modifications will occur to those skilled in the art to which the invention pertains.

In a similar manner, it is understood that such a high accuracy hydraulic scale of the type disclosed has applications outside of the medical field and I do not wish to be limited in scope to just medical applications.

I claim.

1. An improved hydraulic scale comprising in combination:
   (1) a first frame
   (2) a second frame
   (3) at least three hydraulic load cells fixed to said first and second frames and supporting said second frame above and substantially parallel to said first frame, each of said cells being of the unguided piston type,
   (4) a third load carrying frame supported above said second frame, said third frame transmitting the load thereon to said second frame at discrete points on the upper surface of said second frame, said discrete points being substantially directly above the points where said second frame is supported by said load cells, (5) totalizing means for totalizing the pressure from said load cells; and (6) means for measuring said total pressure, to thereby measure the weight of a load placed on said third frame.

2. The combination defined in claim 1 in which said measuring means includes means for determining movement of the pistons of said hydraulic load cells resulting from a change in load, and means for adjusting the volume of the hydraulic portion of said measuring system to cause said load cells to return to their positions before said load change.

3. The combination defined in claim 1 in which said measuring means includes a beam balance supported for rotation about a pivot, means converting said total pressure to a total force, means applying said total force to said beam balance on one side of said pivot, at least one movable weight on the other side of said pivot to balance said force, a linear differential transformer connected to said beam, and means responsive to the signals from said transformer to indicate the balance condition of said beam.

4. The combination defined in claim 1 in which said measuring means including a beam balance supported for rotation about a pivot, means converting said total pressure to a total force, means applying said total force to said beam balance on one side of said pivot, movable weights on the other side of said pivot to balance said force, a measuring hydraulic load cell having a piston and means forming a cylinder, means applying the difference in force resulting from variations in the weight of said load after initial balancing thereof by said beam to the piston of said load cell, means for measuring the output pressure from said cell, and means for adjusting the volume of the hydraulic system including the cylinder of said load cell and said pressure measuring means.

5. A hydraulic scale comprising:
a load supporting means including at least one hydraulic load cell having a piston disposed at an initial position for receiving a position displacing load thereon,
hydraulic load responsive means operatively connected to said load supporting means for sensing the load on said piston,
means including a volume compensating means for returning said piston to said initial position after displacement therefrom with said load thereon,
means for indicating the initial position of said piston, and means connected with said volume compensating means for indicating the weight of a piston displacing load thereon.

6. A hydraulic scale as set forth in claim 5 wherein said cell further includes a housing defining a cavity and a flexible diaphragm disposed across the cavity in said housing supporting said piston thereon, said piston projecting out of said housing and being free of fixed restraint against movement in said housing.

7. A hydraulic scale as set forth in claim 6 further including means to protect the hydraulic load cells from overloading of the scale.

8. A hydraulic scale as set forth in claim 5 wherein said load supporting means includes an upper frame for supporting the load, a lower frame supporting at least three of said load cells thereon, said cells defining a plane and supporting said upper frame thereon.

9. A hydraulic load sensing means including at least three plane defining hydraulic load cells, said cells having pistons therein; a lower frame mounting said load cells thereon; an upper frame for supporting loads thereon supported on said pistons; totalizing means for totalizing the pressure of said load cells, said totalizing means being responsive to a load on said upper frame; measuring means connected to said totalizing means for returning said upper frame to its initial unloaded position and indicating the load on said upper frame, said measuring means including a beam balance supported for rotation about a pivot, means applying the totalized force on one side of the pivot, and means on the beam balance to indicate the weight of the load; and a hydraulic volume compensating system operatively connected to said totalizing means partially opposing the totalizing force and having means to vary the volume of the hydraulic portion of said system whereby upon a subsequent deviation in the weight of the load said means to vary the volume of the hydraulic portion is adjusted to vary the volume to enable said volume compensating system to indicate the weight of the deviation without movement of said weight indicating means on said beam balance.

10. A hydraulic load sensing means including at least three plane defining hydraulic load cells, said cells having pistons therein; a lower frame mounting said load cells thereon; an upper frame for supporting loads thereon supported on said pistons; totalizing means for totalizing the pressure of said load cells, said totalizing means being responsive to a load on said upper frame; and measuring means connected to said totalizing means for returning said upper frame to its initial position and for indicating the load on said upper frame, said measuring means including a beam balance supported for rotation about a pivot, means applying the totalized pressure as a totalized force on one side of the pivot, movable weights on the other side of said pivot to balance said force, a measuring hydraulic load cell having a piston and a diaphragm and means forming a cylinder, means applying the difference in force resulting from variations in the weight of said load after initial balancing thereof by said beam to the piston of said measuring load cell, means for measuring the output pressure from said cell, and means for adjusting the volume of the hydraulic system including the cylinder of said load cell and totalizing means.

11. A hydraulic scale comprising in combination:
a first frame,
a second load receiving frame, the first and second frames having substantially the same coefficient of thermal expansion and the second frame exhibiting substantially no deflection when a load is applied thereto,
at least three hydraulic load cells mounted on the first and supporting the second frame above and substantially parallel to the first frame, each of said cells having a housing defining a cavity, a flexible diaphragm disposed across the cavity in said housing, and a piston on said diaphragm projecting out of said housing, said piston being free of fixed restraint against movement in said housing, one of said cells lying outside a line joining the other two,
totalizing means for totalizing the pressure from said load cells, and
measuring means for measuring said total to thereby measure the weight of a load placed on said second frame, said measuring means including a beam balance for rotation about a pivot, means converting said total pressure to a total force, means applying said total force to said beam balance on one side of said pivot, movable weights on the other side of said pivot to balance said force, a measuring hydraulic load cell having a piston and means forming a cylinder, means applying the difference in force resulting from variations in the weight of said load after initial balancing thereof by said beam to the piston of said load cell, means for measuring the output pressure from said cell, and means for adjusting the volume of the hydraulic system including the cylinder of said load cell and said pressure measuring means.

12. A tare mechanism comprising:
a beam balance mechanism including an adjustable counterweight,
a frame having a plurality of load supporting means thereon, a hydraulic load totalizer having a load cell at one end thereof, said hydraulic load totalizer being connected intermediately thereof to said load supporting means and at an end opposite to said one end to said beam balance mechanism, said beam balancing mechanism reacting to a load placed on said load supporting means, means for adjusting said counterweight to return said beam balance mechanism to initial position after placement of a tare load on said load supporting means, and read-out means connected to said load cell at said one end of said totalizer for determining the differential force between said load supporting means and said beam balance mechanism.

13. A tare mechanism as set forth in claim 12 further comprising volume compensating means connected to said read-out means for returning said read-out means to its initial position after placement of a tare load on said load supporting means.

References Cited

UNITED STATES PATENTS

| | | | |
|---|---|---|---|
| 892,298 | 6/1908 | Palmer | 177—245 X |
| 932,050 | 8/1909 | McFarlane | 177—209 X |
| 1,227,503 | 5/1917 | Troll | 177—209 |
| 2,093,141 | 9/1937 | Sonsalla | 177—209 |
| 2,430,702 | 11/1947 | Bohannan | 177—209 X |
| 2,684,594 | 7/1954 | Furcini | 177—209 X |
| 2,773,685 | 12/1956 | Aagaard | 177—212 X |
| 2,867,433 | 1/1959 | Bergenheim et al. | 177—209 X |
| 2,932,501 | 4/1960 | Hicks | 177—209 |

FOREIGN PATENTS

| | | |
|---|---|---|
| 112,571 | 1/1918 | Great Britain. |

RICHARD B. WILKINSON, *Primary Examiner.*

R. S. WARD, *Assistant Examiner.*